Patented Mar. 23, 1948

2,438,484

UNITED STATES PATENT OFFICE 2,438,484

FLUORINATED DIBASIC ACIDS AND METHOD OF PREPARING SAME

Albert L. Henne, Columbus, Ohio, assignor to The Ohio State University Research Foundation, Columbus, Ohio, a corporation of Ohio No Drawing. Application October 13, 1944, Serial No. 558,607

5 Claims. (Cl. 260—537)

This invention relates to fluorinated dibasic acids and to their preparation through the ring opening of fluorinated cyclo-olefins.

One of the objects of the invention is to provide a new compound consisting of a fluorinated dibasic acid and more specifically fluorinated glutaric acid.

Another object of the invention is to provide a new compound consisting of hexa or per-fluoroglutaric acid.

In carrying out the above objects it is a further object of the invention to provide a method of preparing said new compounds by the ring opening of a halogenated alicyclic olefin compound and more specifically by the ring opening of hexafluorodichlorocyclopentene.

Further objects and advantages will be apparent from the following disclosure.

It has been discovered that fluorinated alicyclic olefin compounds can be opened by an alkaline oxidation reaction to form fluorinated dibasic acids. One of these cyclic olefin derivatives namely hexafluorodichlorocyclopentene can be opened to form perfluoroglutaric acid. The structural formula of the cyclopentene compound is as follows:

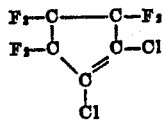

This compound is opened to form a perfluoroglutaric salt which is then treated with acid to form the desired hexafluoroglutaric acid.

In preparing the compound, .5 mole (123 gr.) of hexafluorodichlorocyclopentene is placed in a three necked flask, equipped with a sealed stirrer, six bulb reflux condenser and a dropping funnel, together with 105 gm. of potassium permanganate, 75 gm. of potassium hydroxide and 500 cc. of water. The flask and contents are heated in a water bath at a temperature sufficient to reflux the contents. The reflux is continued for about 12 hours whereupon the contents is steam distilled permitting recovery of about 22 gms. of the hexafluoride.

The reaction occurring during this procedure is:

This reaction mixture consisting of the potassium salt of perfluoroglutaric acid is then acidified with 210 cc. of concentrated sulfuric acid in 250 cc. of water. This causes a reaction whereby the desired perfluoroglutaric acid is formed with a reaction product of potassium sulfate. Sulfur dioxide is then bubbled through the solution to reduce all the manganese dioxide whereupon the hexa or perfluoroglutaric acid can be continuously extracted from the mixture with ether.

Distillation of the extract will yield about 246 gms. of the white crystalline acid with a melting point of 78–88° C., a boiling point of 134–138° C./3 mm. and a molecular weight of 239 (240 theoretical). The acid is very hygroscopic, is soluble in acetone and insoluble in benzene and has a formula of $C_3F_6(COOH)_2$.

From the foregoing it is apparent that I have discovered a new compound together with a method of preparing said compound. It is also manifest that other dibasic acids may be prepared from other fluorinated cyclic olefins by a similar procedure which is apparent to anyone skilled in the art. It is also to be understood that if the alkaline salts of the di-basic acid are desired that these may be extracted prior to addition of the acid.

While the embodiment of the present invention as herein disclosed, constitutes a preferred form, it is to be understood that other forms might be adopted, all coming within the scope of the claims which follow.

What is claimed is as follows:

1. A method of preparing hexafluoroglutaric acid, comprising the steps of; breaking the ring of hexafluorodichlorocyclopentene by oxidation in an alkaline solution for forming an alkaline salt of hexafluoroglutaric acid, adding sulfuric acid in sufficient quantities to react with the alkaline metal of said salt whereby hexafluoroglutaric acid is formed in solution, and then extracting the hexafluoroglutaric acid with ether from said solution.

2. A new composition of matter consisting of the compound hexafluoroglutaric acid.

3. A new class of compounds consisting of hexafluoroglutaric acid and alkaline salts thereof.

4. A new composition of matter consisting of dipotassium hexafluoroglutarate.

5. A new composition of matter consisting of an alkaline salt of hexafluoroglutaric acid.

ALBERT L. HENNE.

REFERENCES CITED

The following references are of record in the file of this patent:

FOREIGN PATENTS

| Number | Country | Date |
|---|---|---|
| 508,526 | Great Britain | July 3, 1939 |
| 50,652 | Switzerland | Dec. 2, 1909 |

OTHER REFERENCES

Zincke: Berichte Deut. Chem. Ges., vol. 25, page 2226 (1892).